United States Patent
Mizuguchi et al.

(10) Patent No.: US 10,275,104 B2
(45) Date of Patent: Apr. 30, 2019

(54) LAMINATE MEMBER AND TOUCH PANEL

(71) Applicant: TORAY INDUSTRIES, INC., Tokyo (JP)

(72) Inventors: Tsukuru Mizuguchi, Otsu (JP); Tomotaka Kawano, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/788,296

(22) Filed: Oct. 19, 2017

(65) Prior Publication Data
US 2018/0059826 A1 Mar. 1, 2018

Related U.S. Application Data

(63) Continuation of application No. PCT/JP2016/060460, filed on Mar. 30, 2016.

(30) Foreign Application Priority Data

Apr. 21, 2015 (JP) .................................. 2015-086438

(51) Int. Cl.
*B32B 15/08* (2006.01)
*G06F 3/044* (2006.01)
(Continued)

(52) U.S. Cl.
CPC .............. *G06F 3/044* (2013.01); *B32B 15/08* (2013.01); *B32B 27/06* (2013.01); *B32B 27/18* (2013.01);
(Continued)

(58) Field of Classification Search
CPC ......... B32B 15/08; B32B 27/06; B32B 27/18; B32B 2307/412; B32B 2309/105;
(Continued)

(56) References Cited

U.S. PATENT DOCUMENTS

| | | | |
|---|---|---|---|
| 7,790,354 B2 * | 9/2010 | Ishigaki .................. | G03F 7/027 430/270.1 |
| 2005/0238998 A1 * | 10/2005 | Nakazato ................ | G03F 7/027 430/281.1 |

(Continued)

FOREIGN PATENT DOCUMENTS

| | | |
|---|---|---|
| JP | 2010-264748 A | 11/2010 |
| JP | 2013-77234 A | 4/2013 |

(Continued)

OTHER PUBLICATIONS

Gupta et al. ("What's The Difference Between Silver Nanowire and ITO for Touchscreens" Electronic Design, published Aug. 5, 2013, accessed at http://www.electronicdesign.com/components/what-s-difference-between-silver-nanowire-and-ito-touchscreens)(Year: 2013).*

(Continued)

*Primary Examiner* — Travis M Figg
(74) *Attorney, Agent, or Firm* — Birch, Stewart, Kolasch & Birch LLP

(57) ABSTRACT

A laminate member is provided which has excellent ion migration resistance between a light-sensitive resin layer and a conductive layer formed on a substrate. This laminate member is provided with a resin layer A formed on the substrate, a transparent electrode layer B formed on the resin layer A, and a conductive layer C formed on the resin layer A and the transparent electrode layer B, wherein the resin layer A contains a resin (a) containing a carboxyl group, the conductive layer C contains a resin (c) having conductive particles and a carboxylic group, the conductive layer C contacts the resin layer A and the transparent electrode layer B, and, defining $S_A$ as the acid value of an organic component contained by the resin layer A and $S_C$ the acid value of an organic component contained by the resin layer C, the value of $S_A$-$S_C$ is 20-150 mg KOH/g.

14 Claims, 6 Drawing Sheets

(51) Int. Cl.
  *B32B 27/18* (2006.01)
  *B32B 27/06* (2006.01)
(52) U.S. Cl.
  CPC ... *B32B 2307/412* (2013.01); *B32B 2309/105* (2013.01); *B32B 2457/208* (2013.01); *G06F 2203/04103* (2013.01)
(58) Field of Classification Search
  CPC ............... B32B 2457/208; G06F 3/044; G06F 2203/04103; H01B 1/22; H01L 51/00; H01L 51/0032; H01L 51/50; H01L 51/5008; H01L 51/5012; G03F 7/004; G03F 7/0047; G03F 7/027; G03F 7/038; G03F 7/0388; G03F 7/11; G03F 7/20; G03F 7/40
  USPC ........................... 428/281.1, 287.1, 319, 321
  See application file for complete search history.

(56) References Cited

U.S. PATENT DOCUMENTS

| | | | | |
|---|---|---|---|---|
| 2007/0218305 A1* | 9/2007 | Ishigaki | ................... | G03F 7/027 428/500 |
| 2008/0258605 A1* | 10/2008 | Yukinobu | .............. | H01L 51/442 313/504 |
| 2010/0260986 A1* | 10/2010 | Ito | ........................... | G06F 3/045 428/212 |
| 2011/0268978 A1* | 11/2011 | Watanabe | ............ | C08K 5/3475 428/500 |
| 2012/0094071 A1* | 4/2012 | Itoh | ......................... | G06F 3/044 428/141 |
| 2012/0181914 A1* | 7/2012 | Fukuda | ................... | B32B 15/08 313/46 |
| 2013/0323521 A1* | 12/2013 | Xia | ......................... | C09J 133/08 428/523 |
| 2015/0056560 A1* | 2/2015 | Mizuguchi | .............. | G03F 7/027 430/325 |
| 2015/0248053 A1* | 9/2015 | Tanabe | ..................... | H01B 1/22 345/174 |
| 2016/0011698 A1 | 1/2016 | Tajiri et al. | | |
| 2016/0018932 A1 | 1/2016 | Nakayama et al. | | |

FOREIGN PATENT DOCUMENTS

| | | | |
|---|---|---|---|
| JP | 2013-206050 A | | 10/2013 |
| JP | 2013206050 A | * | 10/2013 |
| JP | 2013208841 A | * | 10/2013 |
| JP | 2015-18157 A | | 1/2015 |
| TW | 201040026 A1 | | 11/2010 |
| TW | 201348354 A | * | 12/2013 |
| WO | WO 2013/146107 A1 | | 10/2013 |
| WO | WO 2014/156364 A1 | | 10/2014 |
| WO | WO 2014/156827 A1 | | 10/2014 |
| WO | WO 2015/008617 A1 | | 1/2015 |
| WO | WO 2015/046096 A1 | | 4/2015 |

OTHER PUBLICATIONS

JP-2013208841-A Machine Translation (Year: 2013).*
International Search Report for PCT/JP2016/060460 (PCT/ISA/210) dated Jul. 5, 2016.
Written Opinion of the International Searching Authority for PCT/JP2016/060460 (PCT/ISA/237) dated Jul. 5, 2016.

* cited by examiner

LAMINATE MEMBER AND TOUCH PANEL

CROSS REFERENCE TO RELATED APPLICATIONS

This application is a Continuation of PCT International Application No. PCT/JP2016/060460, filed on Mar. 30, 2016, which claims priority under 35 U.S.C. 119(a) to patent application Ser. No. 2015-086438, filed in Japan on Apr. 21, 2015, all of which are hereby expressly incorporated by reference into the present application.

TECHNICAL FIELD

The invention relates to a laminate member and a touch panel.

BACKGROUND ART

Display electrodes formed in a display region of an electrostatic capacitance type touch panel are transparent electrodes made of an ITO (indium tin oxide). Generally, in a process of a pattern processing for such electrodes, a substrate is coated with a metal thin film ITO or the like by sputtering or the like, and, furthermore, a photoresist that is a resin having photosensitivity is applied to a surface of the substrate and is exposed via a photomask, and then, by development, a resist pattern is formed, and, after that, etching and resist removal are performed.

Meanwhile, there has been devised a technology that omits the removal or application of a photoresist that forms a pattern of transparent electrodes by having prepared a stack of a photosensitive resin layer and a transparent electrode layer stacked beforehand on a substrate (Patent Documents 1 and 2).

In an electrostatic capacitance type touch panel, a periphery of a display region is provided with surrounding wiring that connects to the transparent electrodes. Known methods for forming this surrounding wiring are methods in which an electroconductive paste is applied by a screen printing method or the like (Patent Documents 3 and 4) and methods in which an electroconductive paste having photosensitivity is microprocessed by photolithography (Patent Documents 5 to 9). Note that in the case where formation of surrounding wiring that connects to a transparent electrode pattern formed from the aforementioned substrate with a photosensitive resin layer and a transparent electrode layer stacked thereon is attempted, the surrounding wiring formed on the substrate, that is, an electroconductive layer, contacts not only the transparent electrode layer but also the photosensitive resin layer.

PRIOR ART DOCUMENTS

Patent Documents

Patent Document 1: Japanese Unexamined Patent Publication (Kokai) No. 2015-18157
Patent Document 2: Japanese Unexamined Patent Publication (Kokai) No. 2014-199814
Patent Document 3: Japanese Unexamined Patent Publication (Kokai) No. SHO 63-079727
Patent Document 4: Japanese Unexamined Patent Publication (Kokai) No. 2004-073740
Patent Document 5: Japanese Patent No. 5278632
Patent Document 6: International Publication WO 2013/108696
Patent Document 7: Japanese Patent No. 5360285
Patent Document 8: Japanese Patent No. 5403187
Patent Document 9: International Publication WO 2013/146107

SUMMARY OF THE INVENTION

Problems to be Solved by the Invention

However, at a site where the electroconductive layer is in contact with the surface of the photosensitive resin layer on the substrate, ion migration between the electroconductive layer and the photosensitive resin layer has been perceived as a problem.

Therefore, an object of the invention is to provide a laminate member excellent in the resistance to ion migration between a photosensitive resin layer and an electroconductive layer formed on a substrate.

Means for Solving the Problems

As a result of earnest study, the present inventors have found that that a difference between the acid value of a resin having a carboxyl group which a photosensitive resin layer contains and the acid value of a resin having a carboxyl group which an electroconductive layer contains is in the range of 20 to 150 mg KOH/g is very effective in solving the foregoing problem and therefore completed the invention.

That is, the invention provides a laminate member comprising a substrate, a resin layer A formed on the substrate, a transparent electrode layer B formed on the resin layer A, and an electroconductive layer C formed on the resin layer A and the transparent electrode layer B, wherein the resin layer A contains a resin (a) having a carboxyl group, the electroconductive layer C contains a resin (c) having an electroconductive particle and a carboxyl group, and the electroconductive layer C is in contact with the resin layer A and the transparent electrode layer B, and wherein when an acid value of an organic component contained in the resin layer A is $S_A$ and the acid value of an organic component contained in the electroconductive layer C is $S_C$, a value of $S_A-S_C$ is 20 to 150 mg KOH/g.

Advantageous Effects of the Invention

According to the invention, a laminate member very excellent in the resistance to ion migration between the photosensitive resin layer and the electroconductive layer formed on the substrate can be provided.

Furthermore, by stacking an OCA having a benzotriazole-based compound or isobornyl skeleton, the ion migration resistance can be further enhanced.

DESCRIPTION OF PREFERRED EMBODIMENTS

Figure 1:
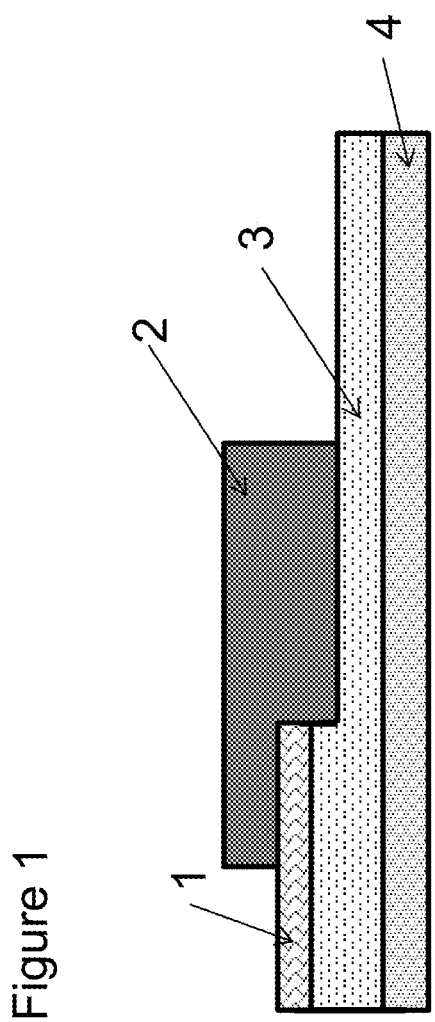
FIG. 1 is a schematic diagram showing a cross section of a laminate member.

The laminate member of the invention is characterized by comprising a substrate, a resin layer A formed on the substrate, a transparent electrode layer B formed on the resin layer A, and an electroconductive layer C formed on the resin layer A and the transparent electrode layer B, wherein the resin layer A contains a resin (a) having a carboxyl group (hereinafter, sometimes referred to as "resin (a)"), the electroconductive layer C contains a resin (c) having an electroconductive particle and a carboxyl group (hereinafter, sometimes referred to as "resin c"), and the electroconductive layer C is in contact with the resin layer A and the transparent electrode layer B, and wherein when the acid value of an organic component contained in the resin layer A is $S_A$ and the acid value of an organic component contained by the electroconductive layer C is $S_C$, the value of $S_A - S_C$ is 20 to 150 mg KOH/g.

The substrate that the laminate member of the invention includes refers to a supporter on whose surface a transparent electrode layer, an electroconductive layer, etc. are to be formed. As the substrate, for example, a rigid substrate, such as a glass, a glass-epoxy substrate, ceramics substrate, etc., or a flexible substrate such as a polyester film, a polyimide film, etc. can be cited.

The resin layer A formed on the substrate is a so-called photosensitive resin layer and performs a function as a photoresist for pattern formation of the transparent electrode layer B. The resin (a) that forms the resin layer A has in its molecular chain a carboxyl group, and is preferably alkali-soluble. As the resin (a), for example, an acrylic-based copolymer, an epoxy carboxylate compound, a polyamic acid, or a siloxane polymer can be cited but one of an acrylic-based copolymer and an epoxy carboxylate compound that are high in visible light transmittance is preferable.

An acrylic-based copolymer having a carboxyl group can be obtained by copolymerizing an acrylic based monomer and an unsaturated acid, such as an unsaturated carboxylic acid, as copolymerization components.

As the acrylic based monomer, for example, acrylic acid (hereinafter, sometimes referred to as "AA", methyl acrylate, ethyl acrylate (hereinafter, sometimes referred to as "EA"), 2-ethylhexyl acrylate, n-butyl acrylate (hereinafter, sometimes referred to as "BA"), iso-butyl acrylate, iso-propane acrylate, glycidyl acrylate, butoxy triethylene glycol acrylate, dicyclopentanyl acrylate, dicyclopentenyl acrylate, 2-hydroxyethyl acrylate, isobornyl acrylate, 2-hydroxy propyl acrylate, isodexyl acrylate, isooctyl acrylate, lauryl acrylate, 2-methoxy ethyl acrylate, methoxy ethylene glycol acrylate, methoxy diethylene glycol acrylate, octafluoropentyl acrylate, phenoxy ethyl acrylate, stearyl acrylate, trifluoroethyl acrylate, aminoethyl acrylate, phenyl acrylate, phenoxy ethyl acrylate, 1-naphthyl acrylate, 2-naphthyl acrylate, thiophenol acrylate, benzyl mercaptan acrylate, allylated cyclohexyl diacrylate, methoxylated cyclohexyl diacrylate, 1,4-butanediol diacrylate, 1,3-butylene glycol diacrylate, ethylene glycol diacrylate, diethylene glycol diacrylate, triethylene glycol diacrylate, polyethylene glycol diacrylate, neopentyl glycol diacrylate, propylene glycol diacrylate, polypropylene glycol diacrylate, triglycerol diacrylate, trimethylol propane triacrylate, ditrimethylol propane tetraacrylate, dipentaerythritol monohydroxy pentaacrylate, dipentaerythritol hexaacrylate, acrylamide, N-methoxy methyl acrylamide, N-ethoxy methyl acrylamide, N-n-butoxymethyl acrylamide, N-isobutoxymethyl acrylamide, epoxy acrylate monomers, such as an acrylic acid adduct of ethylene glycol diglycidyl ether having a hydroxyl group formed by opening an epoxy group ring with an unsaturated acid, an acrylic acid adduct of diethylene glycol diglycidyl ether, an acrylic acid adduct of neopentyl glycol diglycidyl ether, an acrylic acid adduct of glycerin diglycidyl ether, acrylic acid adduct of bisphenol A diglycidyl ether, an acrylic acid adduct of bisphenol F, an acrylic acid adduct of cresol novolac, etc., γ-acryloxypropyltrimethoxysilanes, or compounds formed by substituting acrylic groups of these substances with methacryl groups can be cited. However, for enhancement of the visible light permeability of the resin layer A, an acrylic based monomer having an aliphatic chain or an alicyclic structure is preferred.

As the unsaturated acid, for example, acrylic acid, methacrylic acid, itaconic acid, crotonic acid, maleic acid, fumaric acid, or vinyl acetate, or acid anhydrides of these substances can be cited. By increasing or decreasing the amount of the unsaturated acid used as a copolymerization component, the acid value of the acrylic-based copolymer obtained can be adjusted.

The epoxy carboxylate compound refers to a compound that can be synthesized by using as starting raw materials an epoxy compound and a carboxyl compound that has an unsaturated double bond.

As epoxy compounds that can be a starting raw material, for example, glycidyl ethers, alicyclic epoxy resin, glycidyl esters, glycidyl amines, or epoxy resin can be cited. More concretely, for example, methyl glycidyl ether, ethyl glycidyl ether, butyl glycidyl ether, ethylene glycol diglycidyl ether, diethylene glycol diglycidyl ether, propylene glycol diglycidyl ether, tripropylene glycol diglycidyl ether, neopentyl glycol diglycidyl ether, bisphenol A diglycidyl ether, hydrogenated bisphenol A diglycidyl ether, bisphenol F diglycidyl ether, bisphenol S diglycidyl ether, bisphenol fluorene diglycidyl ether, biphenol diglycidyl ether, tetramethyl biphenol glycidyl ether, trimethylol propane triglycidyl ether, 3',4'-epoxy cyclohexylmethyl-3,4-epoxy cyclohexane carboxylate, or tert-butyl glycidyl amine can be cited.

As a carboxyl compound having an unsaturated double bond that can be a starting raw material, for example, (meth)acrylic acid, crotonic acid, cinnamic acid, or α-cyano cinnamic acid can be cited.

An epoxy carboxylate compound and a polybasic acid anhydride may be reacted so as to adjust the acid value of the epoxy carboxylate compound. As the polybasic acid anhydride, for example, succinic acid anhydride, phthalic anhydride, tetrahydro phthalic anhydride, hexahydro phthalic anhydride, itaconic acid anhydride, 3-methyl tetrahydro phthalic anhydride, 4-methyl hexahydro phthalic anhydride, trimellitic acid anhydride, or maleic anhydride can be cited.

A carboxyl group of an epoxy carboxylate compound whose acid value has been adjusted by a polybasic acid anhydride mentioned above and a compound having an unsaturated double bond, such as glycidyl (meth)acrylate, may be reacted so as to adjust the amount of reactive unsaturated double bonds of the epoxy carboxylate compound.

A hydroxy group that an epoxy carboxylate compound has and a diisocyanate compound may be reacted so as to carry out urethanation. As a diisocyanate compound, for example, hexamethylene diisocyanate, tetramethyl xylene diisocyanate, naphthalene-1,5-diisocyanate, tolylene diisocyanate, trimethyl hexamethylene diisocyanate, isophorone diisocyanate, allyl cyan diisocyanate, or norbornane diisocyanate can be cited.

The acid value of the resin (a) is preferred to be 50 to 250 mg KOH/g because it is preferable that the resin layer A function as an alkali-soluble photoresist, and is more preferred to be 60 to 150 mg KOH/g in order to further enhance pattern workability. Incidentally, the acid value of the resin (a) can be measured in conformity with JIS K0070(1992).

The visible light transmittance of the resin layer A is preferred to be greater than or equal to 80% in the case where a laminate member manufactured by the invention is used as a component element of a touch panel.

The transparent electrode layer B stacked on the resin layer A is not a generally flat layer but a pattern of an arbitrary shape obtained by performing pattern processing by using the function of the resin layer A as a photoresist. That is, the transparent electrode layer does not completely cover the resin layer A; instead, at sites where the pattern of the transparent electrode layer B is not formed, the resin layer A is exposed.

It is preferable that the transparent electrode layer B be made up of only an electroconductive component or contain an electroconductive component. As an electroconductive component that constitutes the transparent electrode layer B, for example, indium, tin, zinc, gallium, antimony, titanium, zirconium, magnesium, aluminum, gold, silver, copper, palladium, tungsten, oxides of these metals, or carbon nanotubes can be cited. More concrete, for example, indium tin oxide (hereinafter, sometimes referred to as "ITO"), indium zinc oxide, indium oxide-zinc oxide composite oxide, aluminum zinc oxide, gallium zinc oxide, fluorine zinc oxide, fluorine indium oxide, antimony tin oxide, or fluorine tin oxide can be cited. In particular, ITO or fibrous silver (hereinafter, sometimes referred to as "silver fiber"), which are high in electroconductivity and visible light permeability and advantageous in cost, is preferred. Silver fiber, which is high in the reliability of connection with an electroconductive layer C described later, is more preferable.

As the formation method for the transparent electrode layer prior to the pattern processing, for example, a vacuum vapor deposition method, a sputtering method, an ion plating method, or a coating method can be cited.

The thickness of the transparent electrode layer B is preferred to be 0.01 to 1.0 μm in order to achieve both good electroconductivity and good visible light permeability. If the thickness of the transparent electrode layer B is greater than or equal to 0.01 μm, variation of the resistance value can be inhibited. On the other hand, if the thickness of the transparent electrode layer B is less than or equal to 1.0 μm, the visible light transmittance can be made high. Incidentally, the visible light transmittance of the transparent electrode layer B is preferred to be greater than or equal to 80% for substantially the same reason as in the case of the resin layer A.

The electroconductive layer C in contact with the resin layer A and the transparent electrode layer B contains an electroconductive particle, and a resin (c). The electroconductive layer C may be a pattern of an arbitrary shape instead of a generally flat layer. In this case, the electroconductive layer C does not completely cover and hide the resin layer A and the transparent electrode layer B but, at sites where the pattern of the electroconductive layer C is not formed, the resin layer A and/or the transparent electrode layer B is exposed.

As the electroconductive particle contained in the electroconductive layer C, silver, gold, copper, platinum, lead, tin, nickel, aluminum, tungsten, molybdenum, chrome, titanium, indium, or alloys of these metal can be cited. Silver, gold, and copper, which are high in electroconductivity, are preferable, and silver, which is high in stability and advantageous in cost, is more preferable.

As for the shape of the electroconductive particle, the aspect ratio that is a value obtained by dividing the long axis length by the short axis length is preferably 1.0 to 3.0 and more preferably 1.0 to 2.0. If the aspect ratio of the electroconductive particle is greater than or equal to 1.0, the probability of contact between electroconductive particles becomes higher. On the other hand, if the aspect ratio of the electroconductive particle is less than or equal to 2.0, exposure light is less easily blocked and the margin for development is widened in the case where the pattern of the electroconductive layer C is formed by the photolithography method. The aspect ratio of an electroconductive particle can be determined by observing electroconductive particles by a scanning type electron microscope (SEM) or a transmission type microscope (TEM), randomly selecting 100 primary particles of the electroconductive particle, measuring the long axis length and the short axis length of each particle, and finding an aspect ratio from an average value of the two values.

The particle diameter of the electroconductive particle is preferably 0.05 to 2.0 μm and more preferably 0.1 to 1.5 μm. If the particle diameter of the electroconductive particle is greater than or equal to 0.05 μm, the interaction between particles is weak and the dispersed state of electroconductive particles can be easily kept. On the other hand, if the particle diameter of the electroconductive particle is less than or equal to 2.0 μm, edges of the pattern of the electroconductive layer C formed can be made sharp. The particle diameter of the electroconductive particle contained in the electroconductive layer C can be calculated by dissolving a sampled electroconductive layer C into tetrahydrofuran (hereinafter, sometimes referred to as "THF"), collecting sedimented electroconductive particle, drying it at 70° C. for 10 minutes in a box oven, observing the dried particle by an electron microscope, randomly selecting 20 primary particles of the electroconductive particle, measuring the maximum width of each particle, and determining an average value of the maximum widths.

The percentage of particles having a particle diameter of 0.3 to 2.0 μm in the electroconductive particle contained in the electroconductive layer C is preferably greater than or equal to 80% and more preferably greater than or equal to 90%, which makes it easy to wash off the electroconductive particle taken into the resin layer A in the case where the pattern of the electroconductive layer C is formed by the photolithography method.

The percentage of particles having a particle diameter of 0.3 to 2.0 μm in the electroconductive particle contained in the electroconductive layer C can be determined from a percentage of primary particles whose maximum widths are in the range of 0.3 to 2.0 μm and which is obtained by observing the electroconductive particle by an electron microscope, random selecting 100 primary particles of the electroconductive particle, and measuring the maximum width of each particle.

The percentage of the electroconductive particle contained in the electroconductive layer C is preferably 60 to 95 mass %. If the percentage of the electroconductive particle is greater than or equal to 60 mass %, the probability of contact between electroconductive particles increases, so that the resistance value of the electroconductive layer C obtained can be stabilized. On the other hand, if the percentage of the electroconductive particle is less than or equal to 95 mass %, the electroconductive of the electroconductive layer C in the case where a laminate member of the invention is bent can be more stabilized.

As the resin (c) that the electroconductive layer C contains, acrylic-based copolymers or epoxy carboxylate compounds can be cited similarly to the resin (a); however, in order to enhance the adhesion property of the electroconductive layer C, epoxy carboxylate compounds are preferable.

The electroconductive layer C may contain a photopolymerization initiating agent. If the electroconductive layer C contains a polymerization initiating agent, the pattern of the electroconductive layer C can be formed by the photolithography method. As the photopolymerization initiating agent, for example, 1,2-octanedione-1-[4-(phenylthio)-2-(O-benzoyloxime)], 2,4,6-trimethylbenzoyl-diphenyl-phosphine oxide, bis(2,4,6-trimethylbenzoyl)-phenyl phosphine oxide, ethanone 1-[9-ethyl-6-2(2-methylbenzoyl)-9H-carbazol-3-yl]-1-(O-acetyloxime), benzophenone, methyl o-benzoylbenzoate, 4,4'-bis(dimethylamino) benzophenone, 4,4'-bis (diethylamino) benzophenone, 4,4'-dichlorobenzophenone, 4-benzoyl-4'-methyl diphenyl ketone, dibenzyl ketone, fluorenone, 2,2'-diethoxyacetophenone, 2,2-dimethoxy-2-phenyl acetophenone, 2-hydroxy-2-methyl propiophenone, p-t-butyl dichloroacetophenone, thioxanthone, 2-methyl thioxanthone, 2-chlorothioxanthone, 2-isopropyl thioxanthone, diethyl thioxanthone, benzyl, benzyl dimethylketal, benzyl-β-methoxy ethyl acetal, benzoin, benzoin methyl ether, benzoin butyl ether, anthraquinone, 2-t-butyl anthraquinone, 2-amyl anthraquinone, β-chloranthraquinone, anthrone, benzanthrone, dibenzosuberone, methylene anthrone, 4-azido benzal acetophenone, 2,6-bis(p-azido benzylidene) cyclohexanone, 6-bis(p-azido benzylidene)-4-methyl cyclohexanone, 1-phenyl-1,2-butanedione-2-(O-methoxycarbonyl) oxime, 1-phenyl-propanedione-2-(O-ethoxycarbonyl) oxime, 1-phenyl-propanedione-2-(O-benzoyl) oxime, 1,3-diphenyl-propane trione-2-(O-ethoxycarbonyl) oxime, 1-phenyl-3-ethoxy-propane trione-2-(O-benzoyl) oxime, Michler ketone, 2-methyl-[4-(methylthio) phenyl]-2-morpholino-1-propanone, naphthalene sulfonyl chloride, quinoline sulfonyl chloride, N-phenylthio phenylthioacridone, 4,4'-azobisisobutyronitrile, diphenyl disulfide, benzthiazole disulfide, triphenyl phosphine, camphorquinone, 2,4-diethyl thioxanthone, isopropyl thioxanthone, carbon tetrabromide, tribromophenyl sulfone, benzoin peroxide, eosin, or a combination of a photoreductive pigment, such as methylene blue, ascorbic acid or a reducing agent, such as triethanol amine, can be cited; however, an oxime ester based compound, high in photosensitivity, is preferable.

The amount of the photopolymerization initiating agent added in the case where the pattern of the electroconductive layer C is formed by the photolithography method is preferably 0.05 to 30 mass parts relative to 100 mass parts of the resin (c). If the addition amount of the photopolymerization initiating agent is greater than or equal to 0.05 mass part, the curing density of exposed portions increases, so that the residual film ratio after development can be enhanced. On the other hand, if the addition amount of the photopolymerization initiating agent is less than or equal to 30 mass parts, the excessive light absorption by the photopolymerization initiating agent is inhibited. As a result, the cross-sectional shape of the pattern of the electroconductive layer C obtained is rectangular and deterioration of the property of adhesion to the resin layer A is inhibited.

The electroconductive layer C may contain a sensitizing agent together with the photopolymerization initiating agent.

As the sensitizing agent, for example, 2,4-diethyl thioxanthone, isopropyl thioxanthone, 2,3-bis(4-diethylamino benzal)cyclopentanone, 2,6-bis(4-dimethylamino benzal) cyclohexanone, 2,6-bis(4-dimethylamino benzal)-4-methyl cyclohexanone, Michler ketone, 4,4-bis(diethylamino) benzophenone, 4,4-bis(dimethylamino) chalcone, 4,4-bis(diethylamino) chalcone, p-dimethylaminocinnamylideneindanone, p-dimethylamino benzylidene indanone, 2-(p-dimethylamino phenyl vinylene) isonaphthothiazole, 1,3-bis (4-dimethylamino phenyl vinylene) isonaphthothiazole, 1,3-bis(4-dimethylamino benzal) acetone, 1,3-carbonyl-bis-(4-diethylamino benzal) acetone, 3,3-carbonyl-bis-(7-diethylaminocoumarin), N-phenyl-N-ethyl ethanol amine, N-phenyl ethanol amine, N-tolyl diethanol amine, dimethylamino benzoic acid isoamyl, diethylamino benzoic acid isoamyl, 3-phenyl-5-benzoyl thiotetrazole, or 1-phenyl-5-ethoxycarbonyl thiotetrazole can be cited.

The addition amount of the sensitizing agent is preferably 0.05 to 10 mass parts relative to 100 mass parts of the resin (c). If the addition amount of the sensitizing agent is greater than or equal to 0.05 mass part, the photosensitivity improves. On the other hand, if the addition amount of the sensitizing agent is less than or equal to 10 mass parts, excessive light absorption in an upper part of the applied film in the case where the pattern of the electroconductive layer C is formed by the photolithography method is inhibited. As a result, the cross-sectional shape of the pattern of the electroconductive layer C formed is rectangular, and the deterioration of the property of adhesion to the resin layer A is inhibited.

The electroconductive layer C may contain a compound that has a urethane bond. When the electroconductive layer C contains a compound that has a urethane bond, the electroconductive layer becomes a flexible layer, so that the entire laminate member can be given flexibility. As a method for causing the electroconductive layer C to contain a compound that has a urethane bond, for example, a method in which a compound that has a urethane bond is added to a composition for forming the electroconductive layer C can be cited. As a compound that has a urethane bond, for example, urethane monomer or polyurethane can be cited.

The addition amount of the compound having a urethane bond in the composition for forming the electroconductive layer C is preferably 0.05 to 100 mass parts relative to 100 mass parts of the resin (c). If the addition amount of the compound with a urethane bond is greater than or equal to 0.05 mass part, the flexibility of the electroconductive layer C obtained is sufficiently high. On the other hand, if the addition amount of the compound that has a urethane bond is less than or equal to 100 mass parts, the electroconductivity of the electroconductive layer C in the case where a laminate member of the invention is bent can be made stabler.

The electroconductive layer C may contain a compound that has a cyclohexane skeleton. When the electroconductive layer C contains a compound that has a cyclohexane skeleton, the electroconductive layer becomes a flexible layer, so that the entire laminate member can be given flexibility. As a method for causing the electroconductive layer C to contain a compound that has a cyclohexane skeleton, for example, a method in which a compound that has a cyclohexane skeleton is added to the composition for forming the electroconductive layer C can be cited. As the compound that has a cyclohexane skeleton, for example, dicyclohexyl methane 4,4'-diisocyanate, trans-4-methyl cyclohexyl isocyanate, TAKENATE 600 (1,3-bis(isocyanate methyl) cyclohexane, made by Mitsui Chemicals, Inc.), 1,2-epoxy cyclohexane, 1-vinyl-3,4-epoxy cyclohexane, REKARESIN DME-100 (1,4-cyclohexane dimethanol diglycidyl ether, made by New Japan Chemical Co., Ltd.), REKARESIN HBE-100 (a polymer of 4,4'-isopropylidene dicyclohexanoland (chloromethyl) oxirane, made by New Japan Chemical Co., Ltd.), ST-4000D (an epoxy resin in which hydrogenated bisphenol A is a main component, made by NIPPON STEEL & SUMIKIN CHEMICAL CO., LTD.), PO adduct diacrylate of hydrogenated bisphenol A, EO adduct dimethacrylate of hydrogenated bisphenol A, PO adduct dimethacrylate of hydrogenated bisphenol A, cyclohexyl acrylate, or cyclohexyl methacrylate can be cited.

The addition amount of the compound having a cyclohexane skeleton in the composition for forming the electroconductive layer C is preferably 0.05 to 100 mass parts relative to 100 mass parts of the resin (c). If the addition amount of the compound having a cyclohexane skeleton is greater than or equal to 0.05 mass parts, the flexibility of the electroconductive layer C obtained is sufficiently high. On the other hand, the addition amount of the compound having a cyclohexane skeleton is less than or equal to 100 mass parts, the electroconductive of the electroconductive layer C in the case where a laminate member of the invention is bent can be more stabilized.

The electroconductive layer C may contain a cured material of epoxy resin. Here, the cured material of epoxy resin refers to a material obtained by reacting the epoxy resin by light or heat. As the epoxy resin, for example, ethylene glycol denaturation epoxy resin, bisphenol A type epoxy resin, hydrogenated bisphenol A type epoxy resin, brominated epoxy resin, bisphenol F type epoxy resin, novolac type epoxy resin, alicyclic epoxy resin, glycidyl amine type epoxy resin, glycidyl ether type epoxy resin, or a heterocyclic epoxy resin can be cited. In order to enhance the property of adhesion to the resin layer A of the electroconductive layer C obtained, bisphenol A type epoxy resin or hydrogenated bisphenol A type epoxy resin is preferable. Hydrogenated bisphenol A type epoxy resin high in the permeability to exposure light in the case where the pattern of the electroconductive layer C is formed in a photolithography method is more preferable.

The addition amount of the epoxy resin in the composition for forming the electroconductive layer C is preferably 0.05 to 20 mass parts relative to 100 mass parts of the resin (c). If the addition amount of the epoxy resin is greater than or equal to 0.05 mass parts, the property of adhesion between the electroconductive layer C and the resin layer A. On the other hand, if the addition amount of the epoxy resin is less than or equal to 20 mass parts, the solubility of an exposed film C to a developing solution is good.

The thickness of the electroconductive layer C is preferably 2.0 to 8.0 µm. If the thickness of the electroconductive layer C is greater than or equal to 2.0 µm, the variation of the resistance can be restrained. On the other hand, if the thickness of the electroconductive layer C is less than or equal to 8.0 µm, the flexibility can be made high.

In order to improve the ion migration resistance of the laminate member of the invention, a difference (value of $S_A - S_C$) between the acid value $S_A$ of the resin layer A and an organic component acid value $S_C$ of the electroconductive layer C is preferably 20 to 150 mg KOH/g, more preferably 30 to 100 mg KOH/g, and even more preferably 40 to 90 mg KOH/g. The electroconductive layer C obtained is high in hygroscopicity due to a resin (c) that has a carboxyl group. Because of the influence thereof, an ion migration phenomenon whose starting point is electroconductive particles easily occurs. However, if the value of $S_A - S_C$ is greater than or equal to 20 mg KOH/g, the resin layer A preferentially absorbs moisture, so that the moisture absorption by the electroconductive layer C is inhibited and, as a result, the ion migration resistance of the laminate member can be improved. On the other hand, if the value of $S_A - S_C$ is less than or equal to 150 mg KOH/g, the amount of hydrogen bonds between carboxyl groups of the resin (a) and the resin (c) contained in the resin layer A and the electroconductive layer C, respectively, can be increased and, therefore, the property of adhesion between the resin layer A and the electroconductive layer C can be improved.

The value of $S_A$ can be calculated by dissolving the 1 mass part of the sampled layer A into 100 mass parts of THF and titrating the solution with a 0.1 mol/L potassium hydroxide solution while a phenolphthalein solution is used as an indicator.

As for the value of $S_C$, the acid value of the electroconductive layer C can be calculated by first dissolving 1 mass part of the sampled electroconductive layer C into 10 mass parts of THF, removing the electroconductive particle by using a filter of the like, and then titrating the solution with a 0.1 mol/L potassium hydroxide solution while a phenolphthalein solution is used as an indicator.

Incidentally, in the case where the composition C contains epoxy resin, the epoxy resin reacts with carboxyl groups in a cure step and, therefore, the organic component acid value of the electroconductive layer C can be reduced. The laminate member of the invention can be coated with an OCA (optical clear adhesive) layer D that has a benzotriazole-based compound or an isobornyl skeleton, for the purpose of inhibiting the migration.

As the benzotriazole-based compound, 1H-benzotriazole (1,2,3-benzotriazole), 4-methyl benzotriazole, 5-methyl benzotriazole, benzotriazole-1-methylamine, 4-methyl benzotriazole-1-methylamine, 5-methyl benzotriazole-1-methylamine, N-methyl benzotriazole-1-methylamine, N-ethyl benzotriazole-1-methylamine, N,N-dimethyl benzotriazole-1-methylamine, N,N-diethyl benzotriazole-1-methylamine, N,N-dipropyl benzotriazole-1-methylamine, N,N-dibutyl benzotriazole-1-methylamine, N,N-dihexyl benzotriazole-1-methylamine, N,N-dioctyl benzotriazole-1-methylamine, N,N-dimethyl-4-benzotriazole-1-methylamine, N,N-dimethyl-5-benzotriazole-1-methylamine, N,N-diethyl-4-benzotriazole-1-methylamine, N,N-diethyl-5-benzotriazole-1-methylamine, N,N-dipropyl-4-benzotriazole-1-methylamine, N,N-dipropyl-5-benzotriazole-1-methylamine, N,N-dibutyl-4-benzotriazole-1-methylamine, N,N-dibutyl-5-benzotriazole-1-methylamine, N,N-dihexyl-4-benzotriazole-1-methylamine, N,N-dihexyl-5-benzotriazole-1-methylamine, etc., can be cited.

As the compound that has an isobornyl skeleton, isobornyl acetate, isobornyl acrylate, isobornyl methacrylate, isobornyl cyclohexanol, etc., can be cited. These compounds may be contained as a constituent of an acrylic copolymer.

An OCA material for forming the OCA layer D can be obtained by applying a tackiness agent that contains the foregoing compound onto a mold release-treated substrate and drying it. Through the heat pressure bonding of the obtained OCA material with a heat laminator or the like, the OCA layer D can be formed.

The touch panel of the invention includes the laminate member produced by the invention. More concretely, the laminate member of the invention can be suitably used as a member for a touch panel. As the system of the touch panel, for example, a resistance film system, an optical system, an electromagnetic induction system, or an electrostatic capacitance system can be cited. However, since the electrostatic capacitance-system touch panel requires particularly minute wiring, a laminate member in which a pattern of the electroconductive layer C has been formed by using a photolithography method, which is one aspect of the invention, can be more suitably used. In a touch panel which includes such a pattern of the electroconductive layer C as a surrounding wiring thereof and in which the surrounding wiring has a pitch of 50 μm or less (wiring width+inter-wiring width), the frame edge width can be narrowed and the viewing area can be broadened.

EXAMPLES

The invention will be described in detail hereinafter with reference to examples and comparative examples, but aspects of the invention are not limited to these.

Materials used in the examples and comparative examples are as follows.

[Resin (a)]

Synthesis Example 1

Copolymerization Ratio (Mass Standard): EA/2-ethylhexyl methacrylate (hereinafter, sometimes referred to as "2-EHMA")/BA/N-methylol acrylamide (hereinafter, sometimes referred to as "MAA")/AA=20/40/20/5/15

150 g of diethylene glycol monoethyl ether acetate (hereinafter, sometimes referred to as "DMEA") was charged into a reaction vessel having a nitrogen atmosphere, and the temperature thereof was raised to 80° C. by using an oil bath. Into this, a mixture made up of 20 g of EA, 40 g of 2-EHMA, 20 g of BA, 5 g of MAA, 15 g of AA, 0.8 g of 2,2'-azobisisobutyronitrile, and 10 g of DMEA was dripped over 1 hour. After the titration ended, polymerization reaction was performed for 6 hours. After that, 1 g of hydroquinone monomethyl ether was added to stop the polymerization reaction. The obtained reaction solution was purified with methanol to remove unreacted impurities, and then vacuum drying was performed for 24 hours, so as to obtain a resin (a-1). The acid value of the resin (a-1) obtained was 103 mg KOH/g.

Synthesis Example 2

Copolymerization Ratio (Mass Standard): EA/2-EHMA/BA/MAA/AA=20/20/20/15/25
150 g of DMEA was charged into a reaction vessel having a nitrogen atmosphere, and the temperature thereof was raised to 80° C. by using an oil bath. Into this a mixture made up of 20 g of EA, 20 g of 2-EHMA, 20 g of BA, 5 g of MAA, 25 g of AA, 0.8 g of 2,2'-azobisisobutyronitrile, and 10 g of DMEA was dripped over 1 hour. After the titration ended, polymerization reaction was performed for 6 hours. After that, 1 g of hydroquinone monomethyl ether was added to stop the polymerization reaction. The obtained reaction solution was purified with methanol to remove unreacted impurities, and then vacuum drying was performed for 24 hours, so as to obtain a resin (a-2). The acid value of the resin (a-2) obtained was 153 mg KOH/g.

Synthesis Example 3

Copolymerization Ratio (Mass Standard): EA/2-EHMA/styrene (hereinafter, sometimes referred to as "St")/glycidyl methacrylate (hereinafter, sometimes referred to as "GMA")/AA=30/30/25/5/10

150 g of DMEA was charged into a reaction vessel having a nitrogen atmosphere, and the temperature thereof was raised to 80° C. Into this, a mixture made up of 30 g of EA, 30 g of 2-EHMA, 25 g of St, 10 g of AA, 0.8 g of 2,2'-azobisisobutyronitrile, and 10 g of DMEA was dripped over 1 hour. After the titration ended, polymerization reaction was performed for 6 hours. After that, 1 g of hydroquinone monomethyl ether was added to stop the polymerization reaction. Uninterruptedly, a mixture made up of 5 g of GMA, 1 g of triethyl benzyl ammonium chloride, and 10 g of DMEA was dripped over 0.5 hour. After the titration ended, an addition reaction was performed for 2 hours. The obtained reaction solution was purified with methanol to remove unreacted impurities, and then vacuum drying was performed for 24 hours, so as to obtain a resin (a-3). The acid value of the resin (a-3) obtained was 83 mg KOH/g.

[Resin (c)]

Synthesis Example 4

Copolymerization Ratio (Mass Standard): EA/2-EHMA/BA/MAA/AA=30/20/20/25/5

150 g of DMEA was charged into a reaction vessel having a nitrogen atmosphere, and the temperature thereof was raised to 80° C. by using an oil bath. In to this, a mixture made of 30 g of EA, 20 g of 2-EHMA, 20 g of BA, 25 g of MAA, 5 g of AA, 0.8 g of 2,2'-azobisisobutyronitrile, and 10 g of DMEA was dripped over 1 hour. After the titration ended, polymerization reaction was performed for 6 hours. After that, 1 g of hydroquinone monomethyl ether was added to stop the polymerization reaction. The obtained reaction solution was purified with methanol to remove unreacted impurities, and then vacuum drying was performed for 24 hours, so as to obtain a resin (c-1). The acid value of the resin (c-1) obtained was 29 mg KOH/g.

Synthesis Example 5

Copolymerization Ratio (Mass Standard): EA/2-EHMA/styrene/GMA/AA=20/40/25/5/10

150 g of DMEA was charged into a reaction vessel having a nitrogen atmosphere of, and the temperature thereof was raised to 80° C. by using an oil bath. Into this, a mixture made up of 20 g of EA, 40 g of 2-EHMA, 25 g of St, 10 g of AA, 0.8 g of 2,2'-azobisisobutyronitrile, and 10 g of DMEA was dripped over 1 hour. After the titration ended, polymerization reaction was performed for 6 hours. After that, 1 g of hydroquinone monomethyl ether was added to stop the polymerization reaction. Uninterruptedly, a mixture made up of 5 g of GMA, 1 g of triethyl benzyl ammonium chloride, and 10 g of DMEA was dripped over 0.5 hour. After the titration ended, an addition reaction was performed for 2 hours. The obtained reaction solution was purified with methanol to remove unreacted impurities, and then vacuum drying was performed for 24 hours, so as to obtain a resin (c-2). The acid value of the resin (c-2) obtained was 73 mg KOH/g.

Synthesis Example 6

492.1 g of carbitol acetate, 860.0 g of EOCN-1035 (made by Nippon Kayaku Co., Ltd., cresol novolac type epoxy resin, epoxy equivalent: 215.0 g/equivalent), 288.3 g of AA, 4.92 g of 2,6-di-tert-butyl-p-cresol, and 4.92 g of triphenyl phosphine was charged into a reaction solution under a nitrogen atmosphere, and were reacted at a temperature of 98° C. until the acid value of the reaction liquid was less than or equal to 0.5 mg·KOH/g. Thus, an epoxy carboxylate compound was obtained. Uninterruptedly, 169.8 g of carbitol acetate and 201.6 g of tetrahydro phthalic anhydride were charged into this reaction liquid, and reaction was conducted at 95° C. for 4 hours. Thus, a resin (c-3) was obtained. The acid value of the resin (c-3) obtained was 104 mg KOH/g.

Synthesis Example 7

368.0 g of RE-310S (made by Nippon Kayaku Co., Ltd., epoxy equivalent: 184.0 g/equivalent), 141.2 g of AA, 1.02 g of hydroquinone monomethyl ether, and 1.53 g of triphenyl phosphine were charged into a reaction vessel having a nitrogen atmosphere, and were reacted at a temperature of 98° C. until the acid value of the reaction liquid was less than or equal to 0.5 mg KOH/g. Thus, an epoxy carboxylate compound was obtained. After that, 755.5 g of carbitol acetate, 268.3 g of 2,2-bis(dimethylol)-propionic acid, 1.08 g of 2-methyl hydroquinone, and 140.3 g of spiroglycol were added to this reaction solution, and the temperature thereof was raised to 45° C. Into this solution, 485.2 g of trimethyl hexamethylene diisocyanate was dripped gradually so that the reaction temperature did not exceed 65° C. After the titration ended, the reaction temperature was raised to 80° C. and reaction was conducted for 6 hours until absorption in the vicinity of 2250 $cm^{-1}$ disappeared on the basis of an infrared absorption spectrum measurement method. Thus, a resin (c-4) was obtained. The acid value of the resin (c-4) obtained was 80.0 mg KOH/g.

[Photopolymerization Initiating Agent]
IRGACURE(registered trademark) OXE-01 (hereinafter, sometimes referred to as "OXE-01") made by Ciba Japan K.K.
IRGACURE(registered trademark) 369 (hereinafter, sometimes referred to as "IC-369") made by Ciba Japan K.K.
[Monomer]
light acrylate MPD-A (hereinafter, sometimes referred to as "MPD-A"), made by Kyoeisha Chemical Co., Ltd.
[Compound Having Urethane Bond]
UA-160™ (made by Kyoeisha Chemical Co., Ltd.)
[Compound Having Cyclohexane Skeleton]
jER(registered trademark) YX-8000 (hereinafter, sometimes referred to as "YX-8000"), made by Mitsubishi Chemical Corporation.
[Transparent Electrode Material]
ITO (97 mass % of indium oxide and 3 mass % of tin oxide)
silver fiber (wire diameter 5 nm, wire length 5 μm)
[OCA (d)]

Synthesis Example 8

150 g of ethyl acetate was charged into a reaction vessel having a nitrogen atmosphere, and the temperature thereof was raised to 80° C. by using an oil bath. Into this, a mixture made up of 50.0 g of EA, 10.0 g of 2-hydroxyethyl acrylate, 0.8 g of 2,2'-azobisisobutyronitrile, and 10 g of ethyl acetate was dripped over 1 hour. After the titration ended, polymerization reaction was performed for 6 hours. After that, 1 g of hydroquinone monomethyl ether was added to stop the polymerization reaction.

Next, 1 g of 1,2,3-benzotriazole was added to the foregoing acrylic copolymer solution, and dilution was carried out with ethyl acetate so that the resin solid content became 30%. Into this, 1.2 g of Duranate P301-75E (made by Asahi Kasei Corporation, a solid content of 75%) was added. This was applied to a PET film of 50 μm one side surface of which had been subjected to a mold release treatment in such an application manner that the thickness thereof after being dried became 25 μm. After the drying at 75° C. for 5 minutes, an OCA (d-1) was obtained.

Synthesis Example 9

150 g of ethyl acetate was charged into a reaction vessel having a nitrogen atmosphere, and the temperature thereof was raised to 80° C. by using an oil bath. Into this, a mixture made up of 50.0 g of isobornyl methacrylate, 10.0 g of 2-hydroxyethyl acrylate, 0.8 g of 2,2'-azobisisobutyronitrile, and 10 g of ethyl acetate was dripped over 1 hour. After the titration ended, polymerization reaction was performed for 6 hours. After that, 1 g of hydroquinone monomethyl ether was added to stop the polymerization reaction.

Next, the aforementioned acrylic copolymer solution was diluted with ethyl acetate so that the resin solid content became 30%. Into this, 1.2 g of Duranate P301-75E (made by Asahi Kasei Corporation, a solid content of 75%) was added. This was applied onto a PET film of 50 μm one side surface of which had been subjected to a mold release treatment in such an application manner that the thickness after the drying became 25 μm. Then, the drying at 75° C. for 5 minutes was carried out so as to obtain an OCA (d-2).

Synthesis Example 10

150 g of ethyl acetate was charged into a reaction vessel having a nitrogen atmosphere, and the temperature thereof was raised to 80° C. by using an oil bath. Into this, a mixture made up of 50.0 g of isobornyl methacrylate, 10.0 g of 2-hydroxyethyl acrylate, 0.8 g of 2,2'-azobisisobutyronitrile, and 10 g of ethyl acetate was dripped over 1 hour. After the titration ended, polymerization reaction was performed for 6 hours. After that, 1 g of hydroquinone monomethyl ether was added to stop the polymerization reaction.

Next, 1 g of 1,2,3-benzotriazole was added into the aforementioned acrylic copolymer solution, and dilution was carried out with ethyl acetate so that the resin solid content became 30%. Into this, 1.2 g of Duranate P301-75E (made by Asahi Kasei Corporation, a solid content of 75%) was added. This was applied onto a PET film of 50 μm one side surface of which had been subjected to a mold release treatment in such a manner that the thickness thereof after drying became 25 μm. Then, the drying at 75° C. for 5 minutes was carried out so as to obtain an OCA (d-3).

Example 1

<Formation of Resin Layer A>
As a substrate, a biaxially drawn polyethylene terephthalate film having a thickness of 30 μm was prepared. A mixture of resin (a-1), MPD-A, and IC-369 mixed at mass proportions of 100:50:1 was applied to one side surface of a substrate. This was heat-treated and dried to form a resin layer A1 whose thickness was 4 μm.
<Formation of Transparent Electrode Layer B>
Using a sputter apparatus having an ITO sintered body target, an ITO thin film of 20 nm in thickness made of ITO was formed on a surface of the resin layer A.
<Pattern Processing of ITO Thin Film>
A photomask was placed in close contact with the ITO thin film. Using an exposure machine having an extra high pressure mercury lamp, the resin layer A1 and the ITO thin film were exposed with an exposure amount of 200 mJ/$cm^2$. Furthermore, without using the photomask, the entire surfaces of the resin layer A1 and the ITO thin film were exposed with an exposure amount of 200 mJ/$cm^2$. After this exposure, spraying development with a 1 mass % sodium carbonate aqueous solution at 30° C. was carried out for 30 seconds to form a pattern-processed transparent electrode layer B1 on the resin layer A1.

<Preparation of Composition for Forming Electroconductive Layer C>

10.0 g of resin (c-1) and 5.0 g of diethylene glycol were put into a clean 100 mL bottle and mixed by a planetary centrifugal vacuum mixer "Awatori Rentarou" (registered trademark) ARE-310 (made by THINKY CORPORATION). Thus, 15.0 g of a resin solution (solid content of 66.7 mass %) was obtained.

Into 15.0 g of the resin solution obtained, 56.7 g of silver particle was mixed. Using a three-roller mill (EXAKT M-50, made by EXAKT company), 71.7 g of a composition C1 was obtained.

<Formation of Electroconductive Layer C>

Using a screen printer, the composition C1 was applied to a surface of the resin layer A1 and the pattern-processed transparent electrode layer B1 so that the film thickness of the electroconductive layer C1 became 6 µm, and cure was carried out at 140° C. for 60 minutes. Thus, laminate members 1 and 2 were produced. The pattern of the electroconductive layer C1 of the laminate member 1 was formed by screen printing.

The acid value $S_A$ of the resin layer A1 of the laminate member 1 was 98 mg KOH/g, the organic component acid value $S_C$ of the electroconductive pattern C1 was 26 mg KOH/g, and the value of $S_A - S_C$ was 72 mg KOH/g.

The acid value $S_A$ of the resin layer A1 was calculated by sampling 1 mass part of the resin layer A1, dissolving it into 100 mass parts of THF, and titrating this solution with a 0.1 mol/L potassium hydroxide solution while using a phenolphthalein solution as an indicator. Furthermore, the organic component acid value $S_C$ of the electroconductive pattern C1 was calculated by sampling 1 mass part of the electroconductive layer C1, dissolving it into 10 mass parts of THF, filtrating the solution with a polypropylene filter with pores of 2 µm, and titrating the filtrate with a 0.1 mol/L potassium hydroxide solution while using a phenolphthalein solution as an indicator. Incidentally, with regard to the values of $S_A$ and $S_C$ being lower than the acid values of the resins (a-1) and (c-1) contained in the resin layer A1 and the electroconductive layer C1, it is considered that, in the cure step, the carboxyl groups were partly lost due to chemical reactions such as dehydration condensation.

<Evaluation of Ion Migration Resistance>

Figure 2:
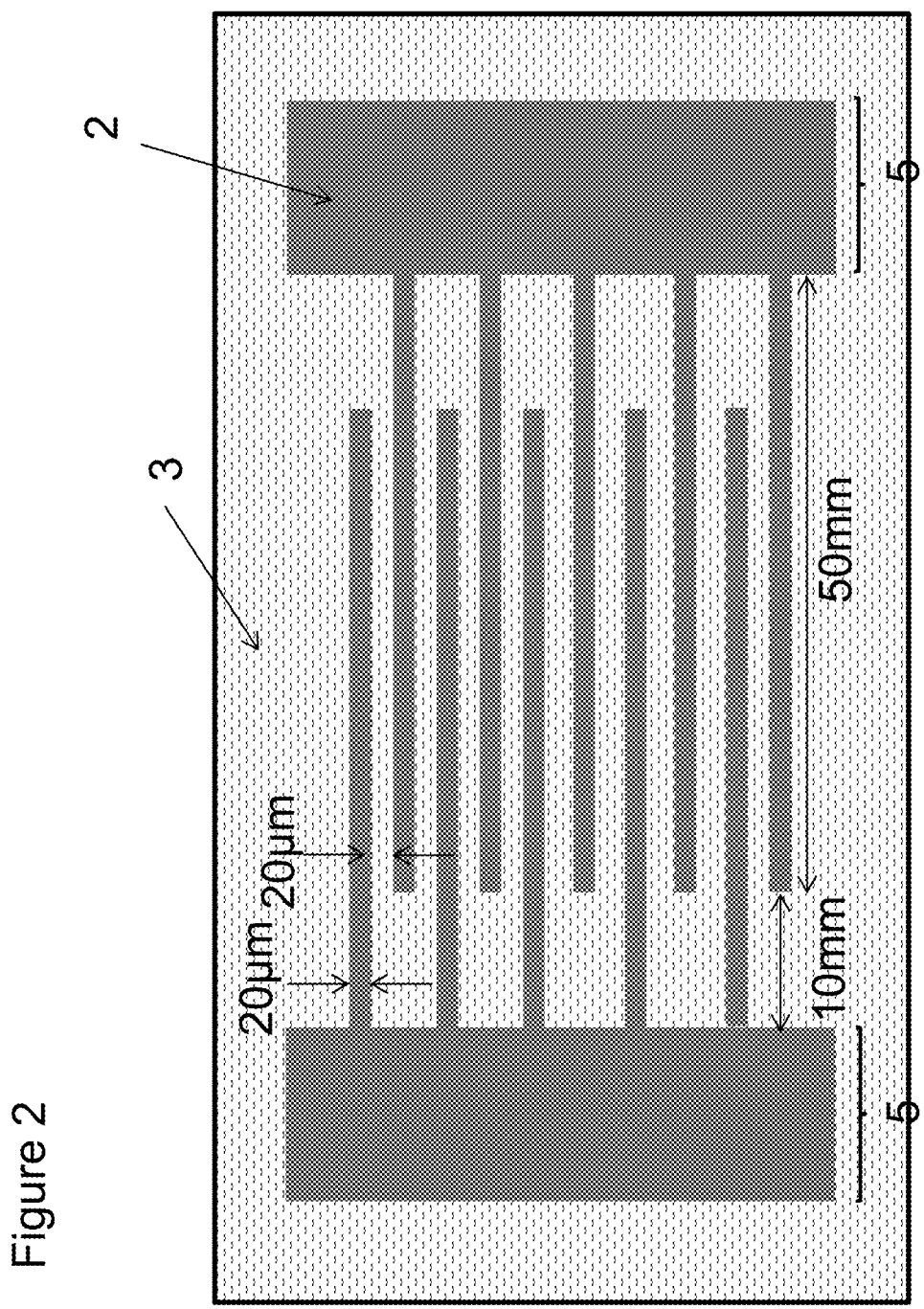
FIG. 2 is a schematic diagram of a laminate member that was used for evaluation of ion migration resistance.

The laminate member 2 shown in FIG. 2 was put into a high-temperature and high-humidity chamber at 85° C. and 85% RH. A voltage of DC 5 V was applied from terminal portions to check the short-circuit duration taken for the resistance value to sharply decrease by three orders of magnitude. The same evaluation was repeated for a total of 10 electroconductive pattern formation members 1. An average value thereof was adopted as a value of the ion migration resistance. Results are shown in Table 2.

<Evaluation of Flexibility>

Figure 3:
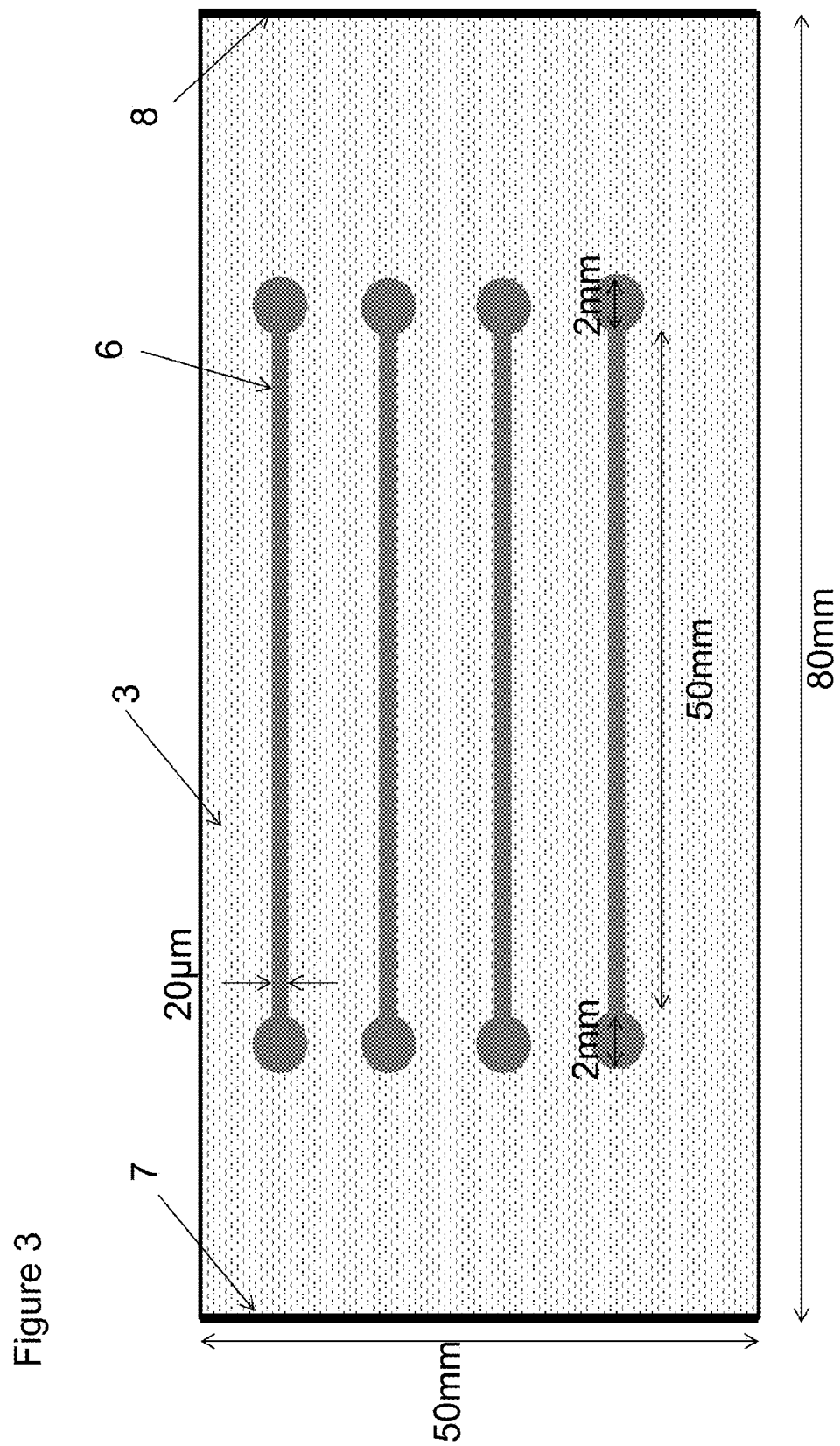
FIG. 3 is a schematic diagram of a laminate member that was used for evaluation of flexibility.
Figure 4:
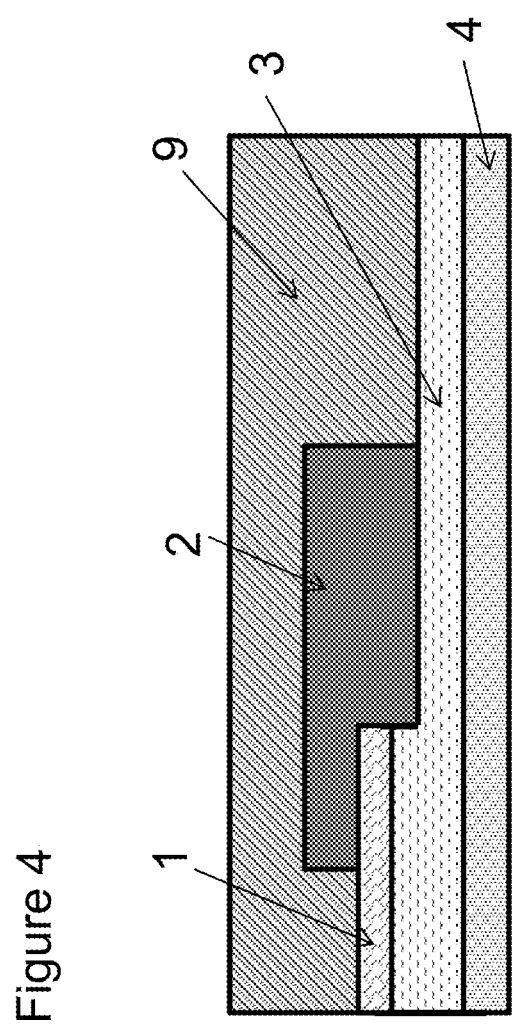
FIG. 4 is a schematic diagram showing a cross section of a laminate member in which an OCA layer has been stacked.

With regard to a laminate member 3 shown in FIG. 3, resistance values were measured by using a tester. After that, a bending operation in which the laminate member is folded so that the electroconductive layer C alternately comes inside, outside, inside, and outside and a short side D and a short side E shown in FIG. 3 are brought into contact with each other, and is returned to the original state is repeated 100 times. Then, using the tester again, the resistance value is measured to calculate the rate (%) of change of the resistance value. Results are shown in Table 2.

Examples 2 to 5

Laminate members shown in Table 1 were produced by substantially the same method as in Example 1 and were evaluated in substantially the same manner as in Example 1. Results are shown in Table 2.

Example 6

A resin layer A and a transparent electrode layer B were formed on a substrate and the pattern processing of an ITO thin film was carried out in substantially the same method as in Example 1.

<Formation of Electroconductive Layer C>

A composition C1 was applied by a screen printer onto surfaces of a resin layer A1 and a pattern-processed transparent electrode layer B1 so that the film thickness of the dried film became 5 µm. After being dried by a hot air dryer at 70° C. for 10 minutes, the dried film was exposed with an exposure amount of 300 mJ/cm², via a predetermined photomask, by an exposure machine equipped with an extra high pressure mercury lamp. After a 0.2 mass % sodium carbonate aqueous solution was sprayed for development at a pressure of 0.1 MPa for 30 seconds, cure was carried out at 140° C. for 60 minutes. Thus, laminate members 4 as shown in FIG. 2 and laminate members 5 as shown in FIG. 3 were produced. The laminate members 4 and 5 were evaluated in substantially the same manner as in Example 1. Results are shown in Table 2.

Examples 7 to 16

Laminate members shown in Table 1 were produced by substantially the same method as in Example 6 and were evaluated in substantially the same manner as in Example 1. Results are shown in Table 2.

Example 17

A laminate member having a resin layer A, a pattern-processed transparent electrode layer B, and an electroconductive layer C stacked on a substrate were produced in substantially the same method as in Example 6.

<Formation of OCA Layer D>

Figure 5:
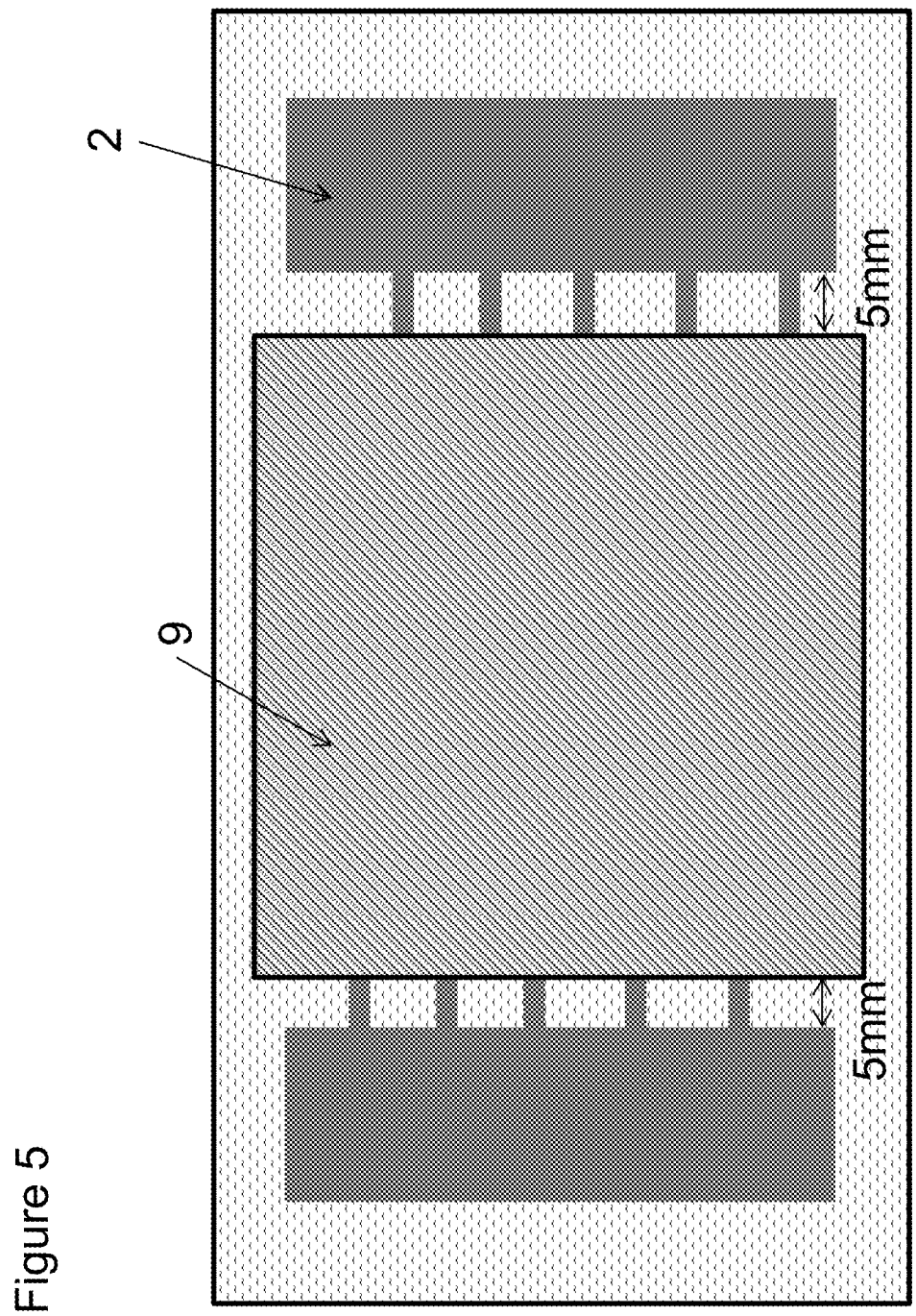
FIG. 5 is a schematic diagram of a laminate member with a stacked OCA layer which was used for evaluation of ion migration resistance.
Figure 6:
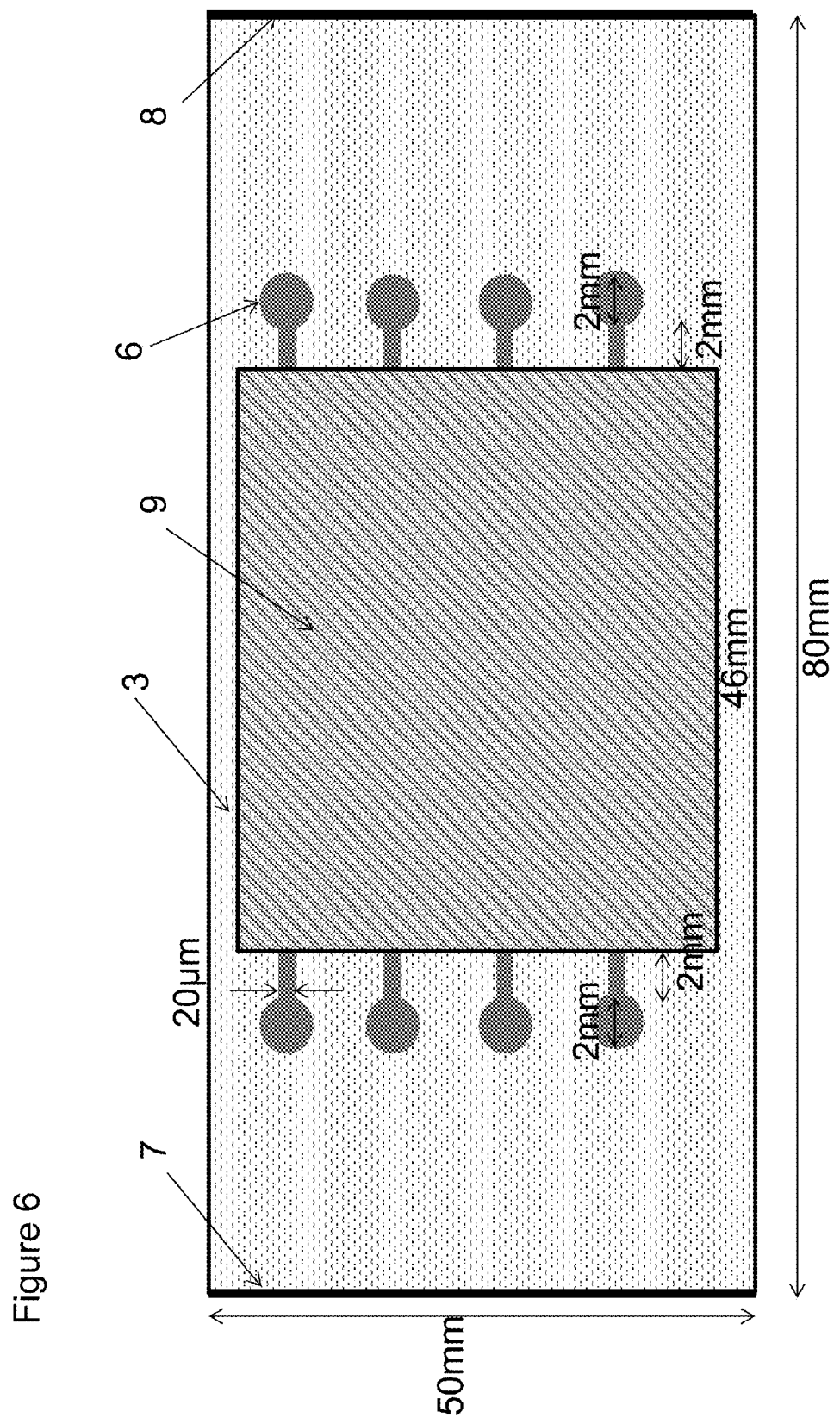
FIG. 6 is a schematic diagram of a laminate member with a stacked OCA layer which was used for evaluation of flexibility.

An OCA (d-1) were laminated on surfaces of the resin layer A1, the pattern-processed transparent electrode layer B1, and the electroconductive layer C1 under the condition of 80° C. and a pressure bonding pressure of 0.5 MPa to produce laminate members 6 as shown in FIG. 5 and laminate members 7 as shown in FIG. 6.

The laminate members 6 and 7 were evaluated in substantially the same manner as in Example 1. Results are shown in Table 2.

Examples 18 to 19

Laminate members shown in Table 1 were produced in substantially the same method as in Example 17 and were evaluated in substantially the same manner as in Example 1. Results are shown in Table 2.

Comparative Examples 1 and 2

Laminate members shown in Table 1 were produced in substantially the same method as in Example 1 and were evaluated in substantially the same manner as in Example 1. Results are shown in Table 2.

Comparative Example 3

A laminate member shown in Table 1 was produced in substantially the same method as in Example 6 and was evaluated in substantially the same manner as in Example 1. Results are shown in Table 2.

TABLE 1

| | Layer A | | | | | Transparent electroconductive layer B | |
|---|---|---|---|---|---|---|---|
| | | Photopolymerization initiating agent | | Monomer | | | |
| | Resin (a) | Component | Addition amount (mass part) to 100 mass parts of resin (a) | Component | Addition amount (mass part) to 100 mass parts of resin (a) | Electroconductive component | Thickness (μm) |
| Example 1 | a-1 | IC-369 | 1 | MPD-A | 50 | ITO | 0.02 |
| Example 2 | a-1 | IC-369 | 1 | MPD-A | 50 | Silver fiber | 0.3 |
| Example 3 | a-1 | IC-369 | 1 | MPD-A | 50 | ITO | 0.02 |
| Example 4 | a-1 | OXE-01 | 1 | MPD-A | 50 | Silver fiber | 0.3 |
| Example 5 | a-1 | OXE-01 | 1 | MPD-A | 50 | Silver fiber | 0.3 |
| Example 6 | a-1 | IC-369 | 1 | MPD-A | 50 | Silver fiber | 0.3 |
| Example 7 | a-1 | OXE-01 | 1 | MPD-A | 50 | Silver fiber | 0.3 |
| Example 8 | a-1 | OXE-01 | 1 | MPD-A | 50 | Silver fiber | 0.3 |
| Example 9 | a-2 | IC-369 | 1 | MPD-A | 50 | ITO | 0.02 |
| Example 10 | a-2 | OXE-01 | 1 | MPD-A | 50 | Silver fiber | 0.3 |
| Example 11 | a-3 | OXE-01 | 1 | MPD-A | 50 | ITO | 0.02 |
| Example 12 | a-3 | OXE-01 | 1 | — | — | Silver fiber | 0.3 |
| Example 13 | a-3 | OXE-01 | 1 | — | — | ITO | 0.02 |
| Example 14 | a-3 | OXE-01 | 1 | — | — | Silver fiber | 0.3 |
| Example 15 | a-1 | IC-369 | 1 | — | — | Silver fiber | 0.3 |
| Example 16 | a-2 | OXE-01 | 1 | MPD-A | 50 | Silver fiber | 0.3 |
| Example 17 | a-1 | IC-369 | 1 | MPD-A | 50 | Silver fiber | 0.3 |
| Example 18 | a-1 | IC-369 | 1 | MPD-A | 50 | Silver fiber | 0.3 |
| Example 19 | a-1 | IC-369 | 1 | MPD-A | 50 | Silver fiber | 0.3 |
| Comparative example 1 | a-1 | IC-369 | 1 | MPD-A | 50 | ITO | 0.02 |
| Comparative example 2 | a-1 | OXE-01 | 1 | MPD-A | 50 | Silver fiber | 0.3 |
| Comparative example 3 | a-1 | OXE-01 | 1 | — | — | Silver fiber | 0.3 |

| | Electroconductive layer C | | | | | |
|---|---|---|---|---|---|---|
| | | Photopolymerization initiating agent | | Electroconductive particle (silver particle) | | |
| | Resin (c) | Component | Addition amount (mass part) to 100 mass parts of resin (c) | Particle diameter (μm) | Percentage (mass %) | Urethane bond-containing compound Component |
| Example 1 | c-1 | — | — | 1.0 | 85 | — |
| Example 2 | c-1 | — | — | 1.0 | 85 | — |
| Example 3 | c-1 | — | — | 1.0 | 85 | — |
| Example 4 | c-2 | — | — | 1.0 | 85 | — |
| Example 5 | c-1 | — | — | 1.0 | 85 | UA-160M |
| Example 6 | c-3 | OXE-01 | 10 | 1.0 | 85 | UA-160M |
| Example 7 | c-4 | IC-369 | 20 | 1.0 | 85 | UA-160M |
| Example 8 | c-4 | OXE-01 | 10 | 1.0 | 85 | — |
| Example 9 | c-3 | OXE-01 | 10 | 1.0 | 85 | — |
| Example 10 | c-4 | OXE-01 | 10 | 1.0 | 85 | — |
| Example 11 | c-2 | OXE-01 | 10 | 1.0 | 85 | — |
| Example 12 | c-2 | IC-369 | 20 | 1.0 | 85 | UA-160M |
| Example 13 | c-1 | IC-369 | 20 | 1.0 | 85 | UA-160M |
| Example 14 | c-4 | OXE-01 | 10 | 1.0 | 85 | — |
| Example 15 | c-4 | OXE-01 | 10 | 1.0 | 85 | — |
| Example 16 | c-1 | IC-369 | 20 | 1.0 | 85 | UA-160M |
| Example 17 | c-3 | OXE-01 | 10 | 1.0 | 85 | UA-160M |
| Example 18 | c-3 | OXE-01 | 10 | 1.0 | 85 | UA-160M |
| Example 19 | c-3 | OXE-01 | 10 | 1.0 | 85 | UA-160M |
| Comparative example 1 | c-3 | — | — | 1.0 | 85 | — |
| Comparative example 2 | c-3 | — | — | 1.0 | 85 | UA-160M |
| Comparative example 3 | c-3 | OXE-01 | 10 | 1.0 | 85 | — |

TABLE 1-continued

| | | Electroconductive layer C | | | | |
|---|---|---|---|---|---|---|
| | | Urethane bond-containing compound | Epoxy resin | | | OCA layer D |
| | | Addition amount (mass part) to 100 mass parts of resin (c) | Component | Addition amount (mass part) to 100 mass parts of resin (c) | Thickness (μm) | Kind |
| Example 1 | | — | — | — | 6.0 | — |
| Example 2 | | — | — | — | 6.0 | — |
| Example 3 | | — | YX-8000 | 20 | 6.0 | — |
| Example 4 | | — | YX-8000 | 20 | 6.0 | — |
| Example 5 | | 30 | — | — | 6.0 | — |
| Example 6 | | 30 | YX-8000 | 20 | 4.0 | — |
| Example 7 | | 30 | YX-8000 | 20 | 4.0 | — |
| Example 8 | | — | YX-8000 | 20 | 4.0 | — |
| Example 9 | | — | — | — | 4.0 | — |
| Example 10 | | — | — | — | 4.0 | — |
| Example 11 | | — | — | — | 4.0 | — |
| Example 12 | | 30 | — | — | 4.0 | — |
| Example 13 | | 30 | YX-8000 | 20 | 4.0 | — |
| Example 14 | | — | YX-8000 | 20 | 4.0 | — |
| Example 15 | | — | — | — | 4.0 | — |
| Example 16 | | 30 | YX-8000 | 40 | 4.0 | — |
| Example 17 | | 30 | YX-8000 | 20 | 4.0 | d-1 |
| Example 18 | | 30 | YX-8000 | 20 | 4.0 | d-2 |
| Example 19 | | 30 | YX-8000 | 20 | 4.0 | d-3 |
| Comparative example 1 | | — | — | — | 6.0 | — |
| Comparative example 2 | | 30 | — | — | 10.0 | — |
| Comparative example 3 | | — | — | — | 4.0 | — |

TABLE 2

| | $S_A$ [mg KOH/g] | $S_C$ [mg KOH/g] | $S_A$-$S_C$ [mg KOH/g] | Ion migration resistance | Flexibility [%] |
|---|---|---|---|---|---|
| Example 1 | 98 | 26 | 72 | 94 | 20 |
| Example 2 | 97 | 24 | 73 | 85 | 23 |
| Example 3 | 97 | 13 | 84 | 131 | 7 |
| Example 4 | 97 | 19 | 78 | 129 | 8 |
| Example 5 | 98 | 25 | 73 | 83 | 6 |
| Example 6 | 99 | 19 | 80 | 124 | 3 |
| Example 7 | 99 | 20 | 79 | 76 | 3 |
| Example 8 | 98 | 28 | 70 | 79 | 6 |
| Example 9 | 135 | 100 | 35 | 72 | 24 |
| Example 10 | 145 | 75 | 70 | 80 | 19 |
| Example 11 | 99 | 65 | 34 | 73 | 25 |
| Example 12 | 100 | 64 | 36 | 78 | 5 |
| Example 13 | 97 | 10 | 87 | 137 | 3 |
| Example 14 | 98 | 18 | 80 | 123 | 6 |
| Example 15 | 98 | 73 | 25 | 35 | 13 |
| Example 16 | 145 | 4 | 141 | 70 | 10 |
| Example 17 | 99 | 19 | 80 | 254 | 5 |
| Example 18 | 99 | 19 | 80 | 304 | 6 |
| Example 19 | 99 | 19 | 80 | 787 | 5 |
| Comparative example 1 | 98 | 99 | −1 | 3 | 22 |
| Comparative example 2 | 99 | 97 | 2 | 8 | 9 |
| Comparative example 3 | 97 | 96 | 1 | 6 | 24 |

It can be understood that, in any one of Examples 1 to 19, a laminate member excellent in ion migration resistance was successfully produced.

INDUSTRIAL APPLICABILITY

The laminate member of the invention can be utilized suitably as a component element of a touch panel.

EXPLANATION OF NUMERALS

1: Transparent electrode layer B
2: Electroconductive pattern C
3: Layer A
4: Supporter
5: Terminal portion
6: Electroconductive layer C
7: Short side D
8: Short side E
9: OCA layer D

The invention claimed is:
1. A laminate member comprising:
a substrate;
a resin layer A formed directly on the substrate;
a transparent electrode layer B formed directly on a first top portion of the resin layer A; and
an electroconductive layer C formed directly on a second top portion of the resin layer A and directly on a top portion of the transparent electrode layer B,
wherein
the resin layer A comprises a resin (a) having carboxyl groups,
the electroconductive layer C comprises a resin (c) having carboxyl groups as an organic component and electroconductive particles,
the transparent electrode layer B is in contact with the first top portion of the resin layer A,
the electroconductive layer C is in contact with the resin layer A and the transparent electrode layer B, and
when an acid value of the resin layer A is $S_A$ and an acid value of the organic component of the electroconductive layer C is $S_C$, a value of a difference $S_A$-$S_C$ is 20 to 150 mg KOH/g.

2. The laminate member according to claim 1, wherein the electroconductive layer C further comprises a photopolymerization initiating agent or a reactant of the photopolymerization initiating agent.

3. The laminate member according to claim 1, wherein the electroconductive layer C further comprises a compound that has a urethane bond.

4. The laminate member according to claim 1, wherein the electroconductive layer C further comprises a compound that has a cyclohexane skeleton.

5. The laminate member according to claim 1, wherein the transparent electrode layer B contains silver.

6. The laminate member according to claim 5, wherein the silver is fibrous.

7. The laminate member according to claim 1, wherein a thickness of the transparent electrode layer B is 0.1 to 1.0 μm and a thickness of the electroconductive layer C is 2.0 to 8.0 μm.

8. The laminate member according to claim 1, which further comprises an optically clear adhesive (OCA) layer D formed on a top portion of each of the resin layer A, the transparent electrode layer B, and the electroconductive layer C, wherein the OCA layer D comprises a compound having an isobornyl skeleton.

9. The laminate member according to claim 8, wherein the OCA layer D contains a benzotriazole-based compound.

10. A touch panel comprising the laminate member according to claim 1.

11. The laminate member according to claim 1, wherein resin (a) comprises an acrylic-based copolymer, an epoxy carboxylate compound, a polyamic acid or a siloxane polymer.

12. The laminate member according to claim 1, wherein resin (a) comprises an acrylic-based copolymer or an epoxy carboxylate compound.

13. The laminate member according to claim 1, wherein resin (c) comprises an epoxy carboxylate compound.

14. The laminate member according to claim 12, wherein resin (c) comprises an epoxy carboxylate compound.

* * * * *